US006164147A

United States Patent [19]

Oen

[11] Patent Number: 6,164,147

[45] Date of Patent: Dec. 26, 2000

[54] ADJUSTABLE LINK MOTION PRESS

[75] Inventor: Richard J. Oen, Wapakoneta, Ohio

[73] Assignee: The Minster Machine Company, Minster, Ohio

[21] Appl. No.: 09/245,942

[22] Filed: Feb. 5, 1999

[51] Int. Cl.[7] .............................. F16H 21/22; B30B 1/06

[52] U.S. Cl. ................................................ 74/44; 100/282

[58] Field of Search ........................ 74/44, 393; 100/273, 100/282

[56] References Cited

U.S. PATENT DOCUMENTS

| | | | |
|---|---|---|---|
| 3,242,768 | 3/1966 | Munschauer, Jr. . | |
| 3,785,282 | 1/1974 | Kamelander . | |
| 3,834,216 | 9/1974 | Schiller et al. . | |
| 4,165,685 | 8/1979 | Nakada et al. . | |
| 4,397,232 | 8/1983 | Schockman et al. | 100/282 X |
| 4,542,674 | 9/1985 | Omo, Jr. . | |
| 4,697,466 | 10/1987 | Sugawara et al. | 74/27 |
| 4,819,474 | 4/1989 | Gober . | |
| 4,846,014 | 7/1989 | Shiga et al. | 74/595 |
| 4,884,433 | 12/1989 | Kato . | |
| 4,890,476 | 1/1990 | Takahashi et al. | 100/282 X |
| 5,000,021 | 4/1991 | Nakamura et al. . | |
| 5,105,684 | 4/1992 | Imanishi . | |
| 5,189,928 | 3/1993 | Ontrop et al. | 100/282 X |
| 5,226,337 | 7/1993 | Imanishi et al. . | |
| 5,299,443 | 4/1994 | Nakamura . | |
| 5,609,099 | 3/1997 | Burns et al. | 100/257 |
| 5,638,748 | 6/1997 | Daniel | 100/282 X |
| 5,782,132 | 7/1998 | Ishibashi et al. . | |

FOREIGN PATENT DOCUMENTS

| | | | |
|---|---|---|---|
| 0322883A1 | 12/1988 | European Pat. Off. | B30B 1/26 |
| 2816-429 | 2/1979 | Germany | 100/282 |
| 51-1677 | 1/1977 | Japan | 100/282 |
| 1-313200 | 12/1989 | Japan | 100/282 |
| 5-77091 | 3/1993 | Japan | 100/282 |
| 1329-992 | 8/1987 | U.S.S.R. | 100/282 |
| 2307199A | 5/1997 | United Kingdom | B30B 1/26 |
| 2335621A | 9/1999 | United Kingdom | B30B 1/26 |

*Primary Examiner*—Charles A Marmor
*Assistant Examiner*—Roger Pang
*Attorney, Agent, or Firm*—Randall J. Knuth

[57] ABSTRACT

A mechanical press having a variable drive arrangement. The press includes a main gear which drives a crankshaft. The drive altering mechanism includes a two piece crown with the main gear connected to the upper crown and the crankshaft connected to the lower crown. Movement of one piece of the crown relative to the other varies the distance between the crankshaft center line and the main gear center line, thereby altering the drive mechanism of the mechanical press and the velocity curve of the press slide.

17 Claims, 4 Drawing Sheets

ADJUSTABLE LINK MOTION PRESS

BACKGROUND OF THE INVENTION

1. Field of the Invention

The present invention relates to mechanical presses and more particularly to adjustment of the press drive without disassembly.

2. Description of the Related Art

Mechanical presses of the type performing stamping and drawing operations employ a conventional construction that includes a frame structure having a crown and a bed portion and which supports a slide in a manner enabling reciprocating movement toward and away from the bed. A press drive assembly including a main gear and a crankshaft is arranged to convert rotary-oscillatory motion into the rectilinear reciprocating motion of the slide. These press machines are widely used for a variety of workpiece operations employing a large selection of die sets, with the press machine varying considerably in size and available tonnage depending on its intended use.

Mechanical presses such as stamping presses and drawing presses, are provided a main gear which imparts rotational motion to a crankshaft. The crankshaft has an eccentric portion, or an eccentric crank pin which translates the rotational motion of the crankshaft into reciprocal mechanical activity that is transmitted to the slide through a connecting arm. One complete rotation of the crankshaft produces one complete reciprocating motion of the slide.

Depending upon the type of drive mechanism utilized, the crankshaft can maintain a constant rotational velocity or an irregular rotational velocity. Irregular rotational velocity of the crankshaft is advantageous in press applications wherein reduction of the slide velocity near the bottom of the stroke is required so that the draw speed of the material is not exceeded. Presses which utilize different arrangements to produce irregular rotational velocity of the crankshaft are known in the art.

A standard press arrangement which produces constant rotational velocity of the crankshaft consists of a crankshaft and main gear arrangement wherein the crankshaft and main gear are concentric. Irregular rotational velocity of the crankshaft of a mechanical press can be achieved by differing arrangements of the crankshaft and the main gear wherein the crankshaft and the main gear are eccentric and are connected through use of a link drive assembly. Arrangements such as a link drive create an irregular rotational velocity which is beneficial in that they can be utilized to reduce the velocity of the slide near bottom dead center so that the draw speed of a particular material is not exceeded.

Presses utilizing similarly sized main gears may be more suitable for a particular workpiece depending upon whether a link drive or a slider crank drive arrangement is used. The ability to alter the drive mechanism of a mechanical press from a slider crank drive to differing link drive arrangements is advantageous in that one particular press may be utilized for different operations. The desire to create a flexible use mechanical press has led to modular type units being utilized. These modular unit presses allow for differing drive mechanisms to be inserted so that the press will operate as a pure slider crank drive or alternatively as a link type drive. Different modular units may be used to create different link drive arrangements and geometries. That is to say, link drive arrangements in which the distance between the center line of the crankshaft and the center line of the main gear is different as well as utilizing links of variable length. The distance between the center line of the main gear and the center line of the crankshaft as well as link lengths will be varied depending upon the modular unit chosen, but will be variable only at steps defined by the particular modular units utilized.

The ability to vary the drive of a press in this way makes the press more versatile in its application, however, having to stop the press for a long period of time to make this adjustment is problematic. Press down time is experienced while drive mechanisms are exchanged. Room to store a number of modular units must also be provided. Additionally, the space in which the press resides must provide enough room above the crown so that different drive mechanisms may be removed and inserted. Currently, the purchaser of a press must utilize the drive mechanism with which the press is initially equipped or must utilize a press which offers different modular drive units and experience the problems mentioned above.

SUMMARY OF THE INVENTION

The present invention is directed to improve upon the aforementioned mechanical press drive adjustment mechanisms wherein it is desired to adjust the drive mechanism of a mechanical press without experiencing down time and without requiring an inventory of mechanism parts.

The present invention provides an adjustable drive mechanism for a mechanical press which includes the ability to vary the distance between the crankshaft center line and the main gear center line without disassembly of the press.

The invention in one form thereof comprises a mechanical press including a two piece crown. One portion of the two piece crown supports the main gear and drive components. The other portion of the two piece crown supports the crankshaft. The two portions of the crown move relative to each other such that the distance between the center line of the main gear and the center line of the crankshaft may be varied according to this relative movement.

The invention in another form thereof includes a two piece crown. One portion of the two piece crown supports the main gear and drive components. The other piece of the two piece crown supports the crankshaft. The crankshaft and main gear are connected by a link drive arrangement. The two portions of the crown may be moved relative to each other such that the drive mechanism may be altered from a pure slider crank arrangement wherein the center line of the crankshaft and the center line of the main gear are concentric and a variable link drive arrangement wherein the crankshaft center line and the main gear center line are eccentric. The distance between the crankshaft center line and the main gear center line (distance D) is fully adjustable such that any distance between an arrangement where these two center lines are concentric and the eccentric arrangement provided when the two portions of the crown are positioned the maximum distance from each other may be achieved. This relative movement of the two portions of the crown may be achieved through hydraulic mechanisms connected between the two portions, rotatable nut adjustment means connected between the two portions or any other device which will provide controllable relative movement to the two crown portions. The main gear may have a centrally located hole to accommodate the crankshaft in any of the differing relative positions of the main gear and the crankshaft.

The invention in another form thereof includes a two piece crown. One portion of the two piece crown supports a drive mechanism which includes a driven means and a driving means which can be, for example, a main gear and a pinion respectively. The designation of the driving means as a pinion is not meant to be limiting in any way and the driving means could include, for example, a motor which is operatively connected to a driveshaft which driveshaft is fixedly connected to a pinion. The other portion of the two piece crown supports a driven member. The two portions of the crown move relative to each other such that the distance between the center line of the drive mechanism and the center line of the driven member may be varied according to this relative movement.

The invention in another form thereof includes hydrostatic pads placed between the two portions of the crown such that movement in a direction other than that of the relative movement of the two crown portions is resisted. These hydrostatic pads may also work to reduce frictional resistance to movement in the direction of relative movement.

An advantage of the present invention is the ability to create a versatile use press that has a drive mechanism which can be altered from a pure slider crank to a link drive mechanism without disassembly such that press down time is effectively eliminated.

Another advantage of the present invention is that flexibility of use for a mechanical press can be achieved without having to purchase and store a large number of different modular drive units.

Another advantage of the present invention is that the distance between the crankshaft center line and the main gear center line is adjustable to any distance between a concentric figuration and the eccentric figuration achieved when the two portions of the crown are at a maximum distance from each other.

A further advantage of the present invention is that increased ceiling height is not required above the flexible drive press.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
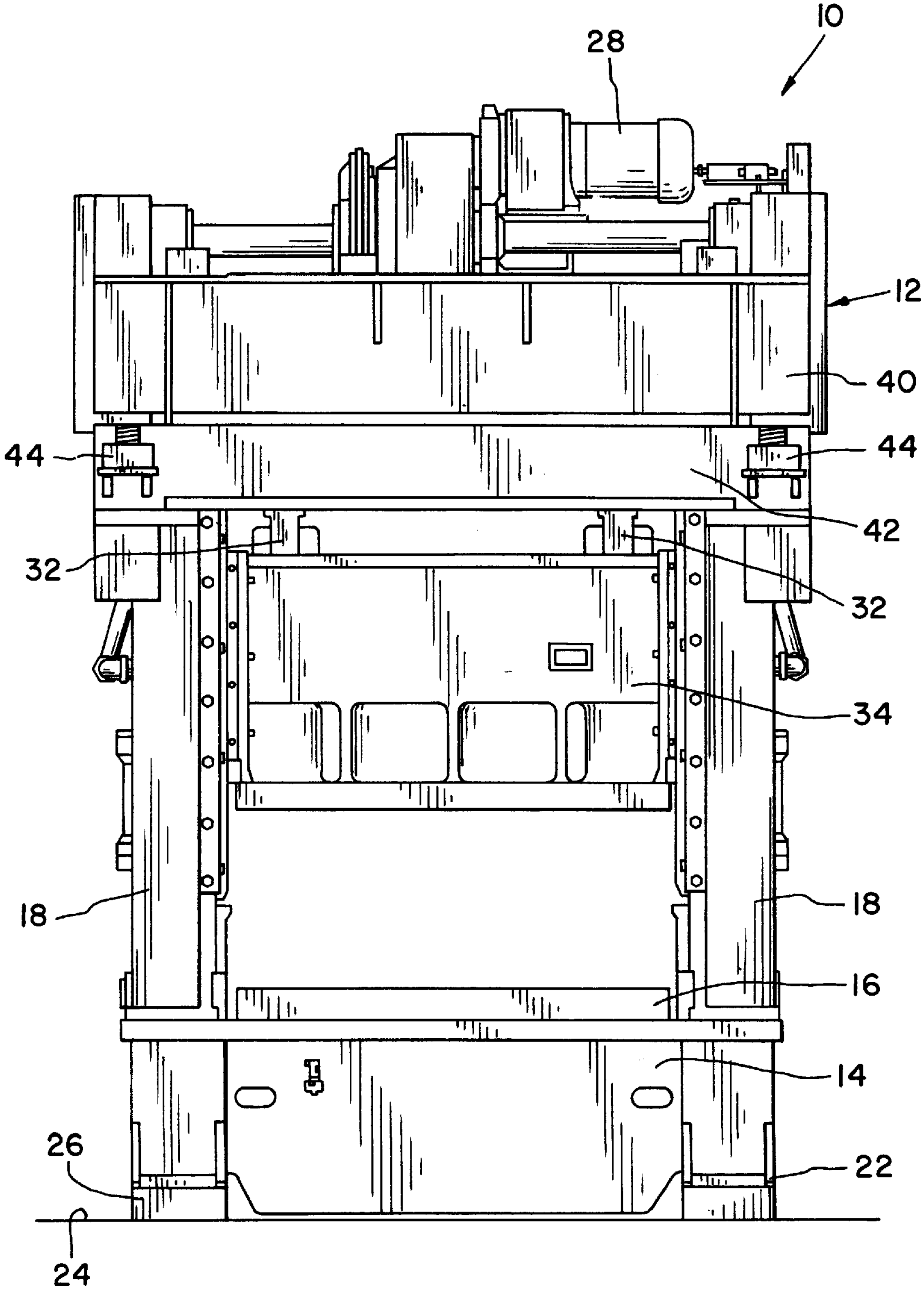
FIG. 1 is an elevational view of a mechanical press incorporating the adjustable drive mechanism of the present invention.

Referring now to the drawings and particularly to FIG. 1, mechanical press 10 comprises a crown housing 12 having an upper crown portion 40 and a lower crown portion 42, a bed portion 14 having a bolster assembly 16 connected thereto and uprights 18 connecting lower crown portion 42 with bed portion 14. The upper crown 40 is connected to the lower crown 42 by a displacement mechanism or adjustment means, for example, by rotatable nut displacement mechanism 44. Uprights 18 are connected or integral with the underside of lower crown 42 and the upper side of bed 14. Tie rods (not shown) extend through crown 12, uprights 18 and bed portion 14 and are attached on each end with tie rod nuts (not shown). Leg members 22 are formed as an extension of bed 14 and are generally mounted to the shop floor 24 by means of shock absorbing pads 26.

Figure 2:
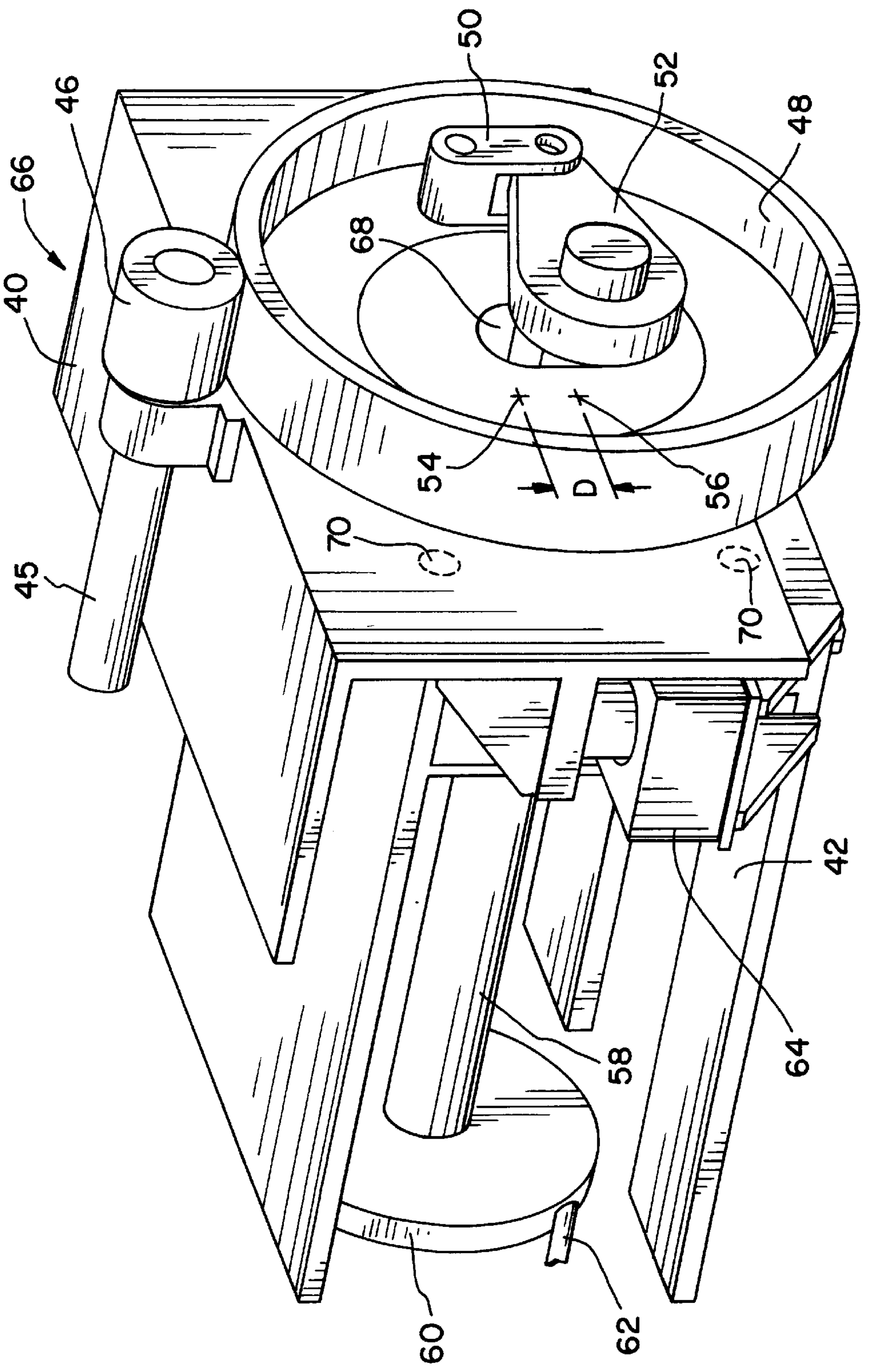
FIG. 2 is a perspective view of one form of the invention.

Referring to FIGS. 1 and 2, a drive mechanism, such as a press drive motor 28, is attached to upper crown 40 of the press and connected by a clutch/brake mechanism (not shown) to the driveshaft 45 which imparts rotational motion to main gear 48, crankshaft 58, crank 60, and crankpin 62 to which connecting rods 32 are attached. A slide 34 is operatively connected to connecting rods 32. During operation, drive motor 28 rotates the crankshaft 58 which operates eccentrically connected connecting rods 32 to cause slide 34 to reciprocate in rectilinear fashion toward and away from the bed 14.

FIG. 2 illustrates one embodiment of the invention including a drive adjustment mechanism 64.

A pinion 46 is supported by upper crown 40 and imparts rotational movement to main gear 48 which is also supported by upper crown 40. Gear link 50 is pivotedly connected at one end to main gear 48 and is pivotedly connected at the other end to one end of crank link 52. The other end of crank link 52 is connected to crankshaft 58 which is supported by lower crown 42 and positioned within main gear hole 68. Hydrostatic pads 70 are positioned between upper crown 40 and lower crown 42.

FIG. 2 shows another form of the displacement mechanism including a hydraulic displacement member 64 connected at one end to lower crown 42 and at the other end to upper crown 40 so that upper crown 40 may be displaced relative to lower crown 42 upon actuation of hydraulic displacement member 64. Any displacement mechanism may be utilized for relative movement of the upper crown 40 with respect to the lower crown 42 so long as the displacement means used are controllable. Relative movement of upper crown 40 upon actuation of hydraulic displacement member 64 works to alter the distance D between the center line of the gear 54 and the center line of the crankshaft 56 thus altering the drive mechanism from a pure slider crank drive to varying link drive arrangements.

FIG. 1 shows another form of the displacement mechanism including four rotatable nut displacement mechanisms. In this embodiment, the four rotatable nut displacement mechanisms are located each in one of the four corners of the crown. In this Fig., the front two rotatable nut displacement mechanisms can be seen while the rear two rotatable nut displacement mechanisms are hidden from view.

Figure 3:
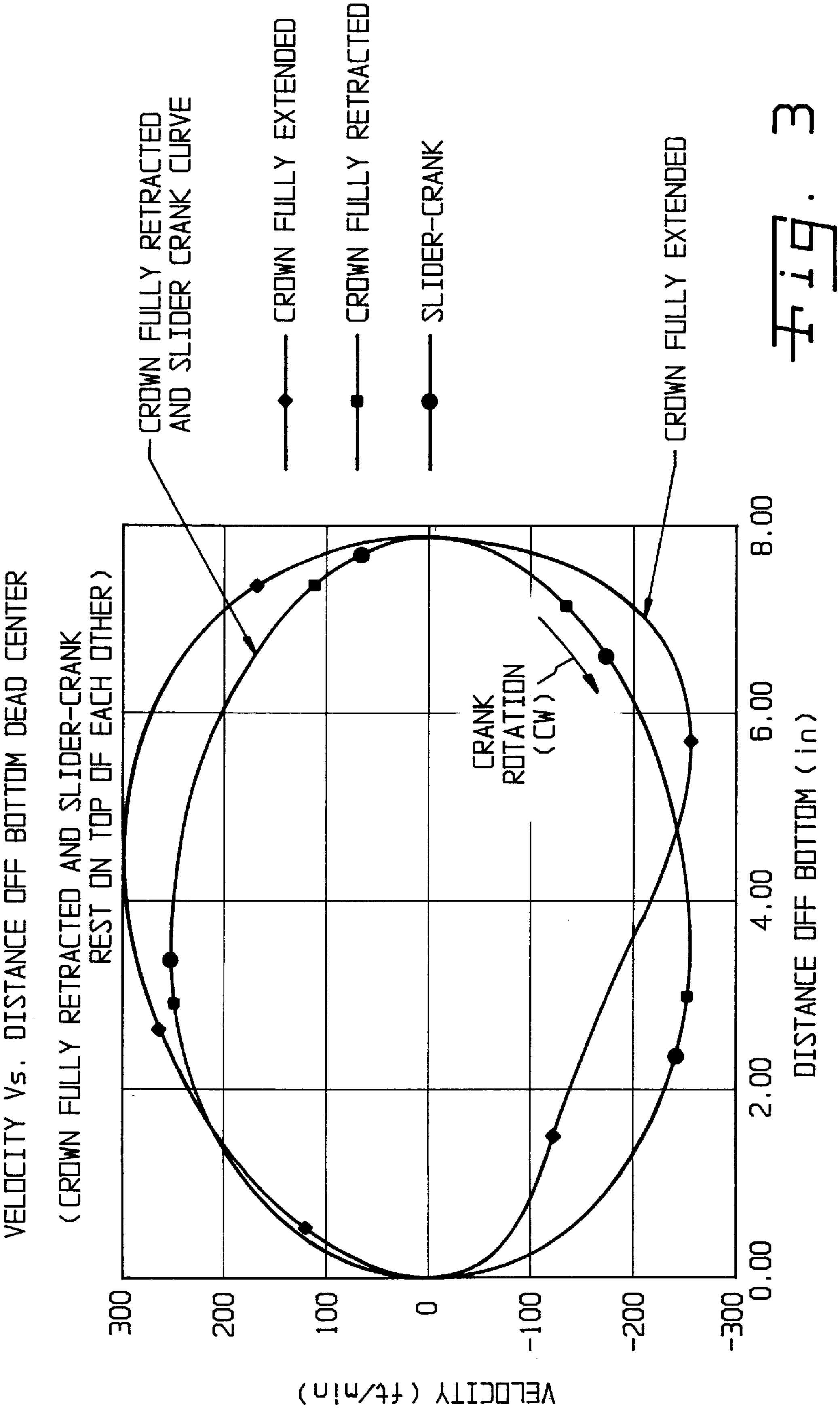
FIG. 3 is a graphical representation of the velocity of the a slide with respect to its distance off bottom dead center.
Figure 4:
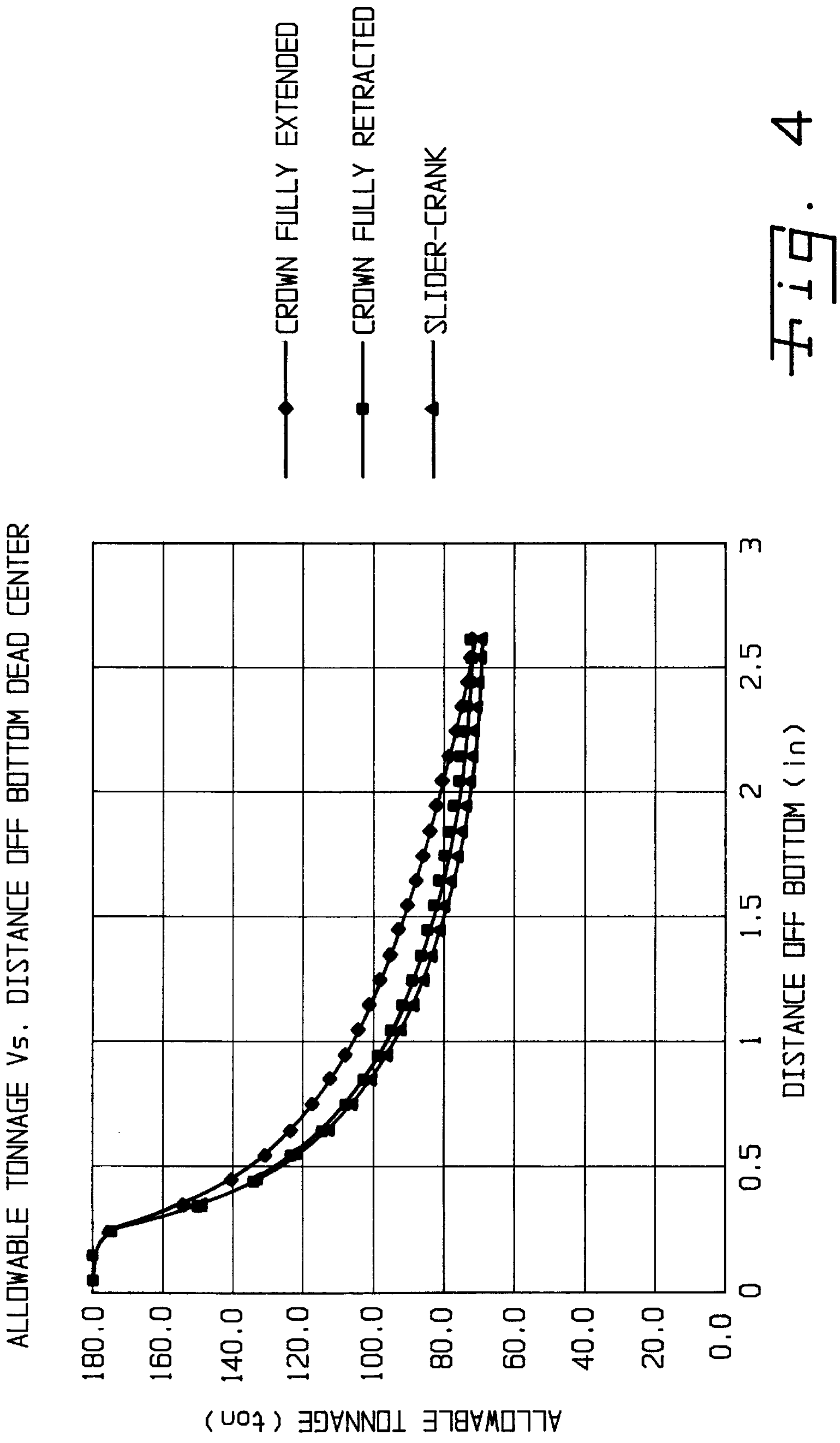
FIG. 4 is a graphical representation of the allowable tonnage vs. distance off bottom dead center.

During press operation, a controller, operator or other mechanism may actuate the displacement mechanism which is connected at one end to the lower crown and at the other end to the upper crown. Actuation of this displacement mechanism moves the upper crown 40 relative to the lower crown 42 and thus alters the distance D between the center line of the main gear 48 and the center line of the crankshaft 58. As the distance D between the center line of the main gear 48 and the center line of the crankshaft 58 is increased, the structure creates a slide motion during main gear rotation that consists of slower slide motion near bottom dead center and faster slide motion near top dead center. The slide velocity vs. distance off bottom dead center curve, as seen in FIG. 3, can be altered such that the velocity vs. distance off bottom dead center curve may be any curve between the curve associated with the crown in a fully retracted position and the curve associated with the crown in a fully extended configuration. Additionally, the allowable tonnage vs. distance off bottom dead center curve, as seen in FIG. 4, will also be altered as the position of the two crown pieces maintain different relative positions. A family of curves showing allowable tonnage vs. distance off bottom dead center may be achieved. Depending upon the relative position of the two crown portions, an allowable tonnage vs. distance off bottom dead center curve somewhere between the curve, which is associated with press operation when the crown is fully extended and the curve which is associated with press operation when the crown is fully retracted is achieved.

In the embodiment shown in FIG. 2, actuation of the displacement members moves upper crown 40 relative to the lower crown 42. As this relative movement takes place, hydrostatic pads 70 may work to decrease frictional resistance between upper crown 40 and lower crown 42. Hydrostatic pads 70 further work to prevent displacement of upper crown 40 in any direction other than the vertical displacement induced by the displacement mechanism, for example the hydraulic displacement mechanism 64.

Similar to the rotatable nut displacement mechanism previously discussed, four hydraulic displacement means 64 each having an upper end and lower end, the lower end attached to the lower crown portion with the upper ends attached to the upper crown portion may occupy the four corners of the two piece crown, only one corner being depicted in FIG. 2.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An adjustable drive mechanism for a press, comprising:

a link drive having a center line;

a crankshaft having a center line; and adjustment means for varying the distance between said crankshaft center line and said link drive center line without disassembly of the drive mechanism, thereby altering a slide velocity versus distance off bottom dead center curve of the press, said adjustment means including a two piece housing having an upper portion and a lower portion, said upper housing portion rotatably supporting said link drive, said lower housing portion rotatably supporting said crankshaft and displacement means for controllable displacement of said upper housing portion relative to said lower housing portion.

2. The adjustable drive mechanism as recited in claim 1, further comprising:

at least one hydrostatic pad operably located between said lower housing portion and said upper housing portion to reduce frictional resistance during relative movement of said upper housing portion and said lower housing portion and to resist forces in directions other than the direction of relative displacement during stamping.

3. The adjustable drive mechanism as recited in claim 2, wherein said displacement means comprises:

at least one hydraulic displacement member, each of said at least one hydraulic displacement member having an upper end and a lower end, said lower end of each said at least one hydraulic displacement member operably attached to said lower housing portion, said upper end of each said at least one hydraulic displacement member operably attached to said upper housing portion.

4. The adjustable drive mechanism as recited in claim 2, wherein said displacement means comprises:

at least one rotatable nut displacement member, each of said at least one rotatable nut displacement member having an upper end and a lower end, said lower end of said at least one rotatable nut displacement member operably attached to said lower housing portion, said upper end of said at least one rotatable nut displacement member operably attached to said upper housing portion.

5. An adjustable drive mechanism, comprising:

housing means for supporting the drive mechanism;

rotational driving means rotatably supported by said housing means;

rotational driven means having a centrally located hole, said rotational driven means rotatably supported by said housing means and rotationally driven by said rotational driving means;

a first link having a first end and a second end, said first end of said first link pivotally connected to an eccentric portion of said rotational driven means;

a second link having a first end and a second end, said first end of said second link pivotally connected to said second end of said first link;

a crankshaft rotatably supported by said housing means, said crankshaft having a first end located within said hole, said first end of said crankshaft fixedly attached to said second end of said second link; and drive altering means for varying the eccentricity of said crankshaft and said rotational driven means without the drive mechanism being disassembled.

6. The adjustable drive mechanism as recited in claim 5, wherein said housing means comprises:

a two piece housing having an upper portion and a lower portion, said upper housing portion rotatably supporting said rotational driving means and said rotational driven means, said lower housing portion rotatably supporting said crankshaft.

7. The adjustable drive mechanism as recited in claim 6, wherein said drive altering means comprises:

displacement means for controllable displacement of said upper housing portion relative to said lower housing portion.

8. An adjustable drive apparatus for use with a mechanical press, comprising:

a two piece crown having an upper crown portion and a lower crown portion;

rotational driving means rotatably supported by said upper crown portion;

rotational driven means having a centrally located hole, said rotational driven means rotatably supported by said upper crown portion and rotationally driven by said rotational driving means;

a first link having a first end and a second end, said first end of said first link pivotally connected to an eccentric portion of said rotational driven means;

a second link having a first end and a second end, said first end of said second link pivotally connected to said second end of said first link; and a crankshaft rotatably supported by said lower crown portion, said crankshaft having a first end located within said hole, said first end of said crankshaft fixedly attached to said second end of said second link.

9. The adjustable drive apparatus as recited in claim 8, wherein said rotational driving means comprises:

a pinion.

10. The adjustable drive apparatus as recited in claim 8, wherein said rotational driven means comprises:

a main gear.

11. The adjustable drive apparatus as recited in claim 9, wherein said rotational driven means comprises:

a main gear.

12. The adjustable drive apparatus as recited in claim 8, further comprising:

displacement means for controllable displacement of said upper crown portion relative to said lower crown portion.

13. The adjustable drive apparatus as recited in claim 9, further comprising:

displacement means for controllable displacement of said upper crown portion relative to said lower crown portion.

14. The adjustable drive apparatus as recited in claim 10, further comprising:

displacement means for controllable displacement of said upper crown portion. relative to said lower crown portion.

15. An adjustable drive apparatus for use with a mechanical press, comprising:

a two piece crown having an upper crown portion and a lower crown portion and four corners;

a pinion rotatably supported by said upper crown portion;

a gear having a centrally located oval hole, said gear rotatably mounted to said upper crown portion and rotationally driven by said pinion;

a gear link having a first end and a second end, said first end of said gear link pivotally connected to an eccentric portion of said gear;

a crank link having a first end and a second end, said first end of said crank link pivotally connected to said second end of said gear link;

a crankshaft rotatably supported by said lower crown portion, said crankshaft having a first end located within said oval hole, said first end of said crankshaft fixedly attached to said second end of said crank link;

displacement means for controllable vertical displacement of said upper crown portion relative to said lower crown portion; and at least one hydrostatic pad operably located between said lower crown portion and said upper crown portion to reduce frictional resistance during relative movement of said upper crown portion and said lower crown portion and to resist forces in directions other than the direction of relative displacement during stamping.

16. The adjustable drive apparatus as recited in claim 15, wherein said displacement means comprises:

four hydraulic displacement means, each of said four hydraulic displacement means having an upper end and a lower end, each said lower end of said four hydraulic displacement means operably attached to said lower crown portion, each said upper end of said four hydraulic displacement means operably attached to said upper crown portion, each of said four hydraulic displacement means occupying one of said four corners of said two piece crown.

17. The adjustable drive apparatus as recited in claim 15, wherein said displacement means comprises:

four rotatable nut displacement means, each of said four rotatable nut displacement means having an upper end and a lower end, each said lower end of said four rotatable nut displacement means operably attached to said lower crown portion, each said upper end of said four rotatable nut displacement means operably attached to said upper crown portion, each of said four rotatable nut displacement means occupying one of said four corners of said two piece crown.

* * * * *